March 24, 1970  SHOHEI YOSHIMURA  3,502,528
METHOD FOR PREPARING POLYPROPYLENE FILMS
Filed April 19, 1967

INVENTOR
SHOHEI YOSHIMURA
BY Wenderoth, Lind & Ponack
ATTORNEYS

3,502,528
METHOD FOR PREPARING POLYPROPYLENE FILMS

Shohei Yoshimura, Ootsu, Japan, assignor to Toyo Boseki Kabushiki Kaisha, Osaka, Japan
Filed Apr. 19, 1967, Ser. No. 632,027
Claims priority, application Japan, Apr. 22, 1966, 41/25,716
Int. Cl. B32b 31/08
U.S. Cl. 156—164     9 Claims

ABSTRACT OF THE DISCLOSURE

A method of producing a polypropylene film laminate which comprises superposing a plurality of polypropylene films, cold-drawing the superposed films between a low speed roll and a high speed roll associated with a heating roll, the superposed film laminate being passed over the low speed roll and then between the high speed roll and the heating roll, the directing being at a rate sufficient to cause the formation of voids in the films, keeping the temperature no higher than 45° C. on at least one surface of the film laminate as it is fed to the cold-drawing rolls, and then heat treating the resulting film laminate by press-contacting the same on a series of heated rolls. The method includes the step of directing cooling air against one surface of the laminate immediately before it contacts the high speed roll so as to produce a temperature difference of at least 10° C. between the surface of the laminate as it is fed to the high speed roll.

---

The present invention relates to the production of laminated polypropylene film having pearly luster.

It is known from British Patent No. 922,288 to produce polypropylene film having silvery or metallic appearance. According to this patent, a polypropylene film of 0.002 to 0.003 inch in thickness is drawn through a neck with a draw ratio of 5.5 or higher to cause the formation of voids in the film. However, this method has various drawbacks that a stable drawing operation is very difficult. Thus, for example, since a film is rapidly stretched through a localized neck at a relatively low temperature to form voids a slight defect present in the film such as slight cracks or flaws, presence of small particles, etc. would cause the formation of pin holes and/or breakage of the film. Therefore, for the satisfactory and stable industrial operation, the rate of feed of film must be lowered such as about 0.3 m./min. at the final speed as wound. Even when the feed or drawing rate is so lowered, there is still a high tendency of the pin hole formation. Further, the resulting film is not fully satisfactory in the pearly luster. Further, a thick film cannot be obtained by this known method.

Therefore, a principal object of this invention is to enable increase in the feed rate in the production of polypropylene having pearly luster, hence to increase the productive capacity.

Another object of this invention is to produce polypropylene films of the kind mentioned above which are thicker than those obtainable by the conventional method.

It is another object of this invention to produce polypropylene films having satisfactory pearly luster but having substantially no pin holes.

I have found that these and other objects of this invention can be accomplished by superposing a plurality of polypropylene films, cold-drawing the superposed films through a neck at a rate sufficient to cause the formation of voids while keeping a temperature of 45° C. or less of at least one surface of the film laminate as fed in the necking stage, and then heat treating the film laminate by continuously press-contacting the same on a series of heated rolls.

In the present invention, the term "polypropylene" means crystalline polypropylene containing at least 65% by weight of isotactic polypropylene. Needless to say, the polypropylene may contain a small amount of usual additives such as pigment, anti-oxidant, anti-static agent, stabilizer, plasticizer, etc.

The propylene film to be subjected to the drawing according to this invention may be produced in any suitable manner well known per se. For example, a molten polypropylene is extruded through a slit into a film, which is then quenched. Each film to be used in this invention should have a thickness of $200\mu$ or less, preferably $120\mu$ or less. Usually the thickness is $15-200\mu$.

One of the important features of this invention is to superpose a plurality of these films. Thus two or more films are superposed but the total thickness should not exceed $1000\mu$, and the number of films should not exceed 10. If the total thickness and/or number of films to be superposed exceeds the above limit the drawing operation will become difficult and/or no satisfactory void formation would occur. The superposed films or film laminate may comprise films of different thicknesses. In such case, however, the ratio of minimum thickness to maximum thickness should be within 1.0–2.0. It is preferable however to use a thickness less than $50\mu$, most preferably $20-50\mu$, for the film which would constitute the uppermost layer of the resulting pearly film laminate.

The film laminate is then subjected to the so-called "necking-draw." The necking-draw is conducted by continuously passing over a low speed roll and high speed roll, thereby forming a neck in the laminate immediately before contacting the high speed roll. The draw ratio is generally 4–10, preferably 4.5–8.0. It has been found to be preferable that the difference between the above two rolls, that is a length of the film laminate between the point where it leaves the low speed roll and the point where it contacts the high speed roll, should be small, i.e. 0.1–10 mm., preferably 0.5–7 mm. The temperature of the laminate before the formation of a neck should be not higher than 45° C. at least at one surface of the laminate. It is preferable that this temperature is 5–35° C. It is further preferable to provide a temperature gradient between one surface and the other of the same laminate. The difference in temperature between the surfaces is usually more than 5° C., preferably more than 10° C. (most preferably more than 50° C.). If the temperature of one surface is kept below 45° C. the other surface may be heated even up to 150° C. If the temperature of at least one surface is higher than 45° C., no satisfactory pearly luster will be obtained in the resulting film. However, if it is unduly low no uniform drawing can be effected and there would be caused damage (breakage) of the film. In order to obtain the preferable temperature condition mentioned above, it is recommended to arrange temperature conditioning rolls in association with the respective low and high speed rolls and/or applying a flow of cooling medium to one surface of the film laminate immediately before the neck formation. The association of a heated roller in contact with the high speed roll is preefrable also for localising the position of the neck.

During the drawing the films constituting the laminate are closely superposed and contacted together (without using an adhesive or fusion) and are passed over the rolls while being press-contacted thereto. After the drawing each of these films adheres adjacent one to form a unitary laminate. The reason why the superposed films are so adhered together upon being drawn is not fully clear but it is not due to fusion in view of the rather low temperature employed. The resulting laminate has pearly luster.

The adhesive power (or power required to delaminate) of the component film in the resulting laminate is higher than 50 g./cm.², usually higher than 80 g./cm.², when the temperature difference mentioned before is 30–50° C. This adhesive power is sufficient in the usual use of the laminate having pearly luster. If desired only the surface or uppermost film layer may readily be delaminated. If such delamination is desired, it is preferable to decrease the temperature difference mentioned before to 20° C. or less and/or shorten the distance between the drawing rolls, thereby decreasing the adhesive power to less than about 50 g./cm.². The adhesive power can also be decreased by selecting a polypropylene film having a higher specific gravity and by lowering the draw ratio. Thus, it is possible to use a waste film as the uppermost layer of the laminate and separate the same after drawing. It is also possible to remove by delamination the uppermost layer which may have pin holes produced during the drawing. Such delamination may also be carried out even after the subsequent heat setting or heat treatment.

After the drawing through a neck to produce voids, it is preferable to conduct heat treatment or heat setting. This heat treatment is generally conducted at a temperature of 100–160° C. for 0.5–60 seconds, preferably for 1–20 seconds. In carrying out this heat treatment, the drawn laminate is passed over and in press-contact with a series of heated rolls. By this heat treatment the adhesive power mentioned before is increased to 4–5 times the original. Further, the film laminate is dimensionally stabilized by this heat treatment. It is preferable to conduct the heat treatment with a slight stretch, e.g. with a draw ratio of about 1.2–1.7 because the adhesive power is further increased. In order to further improve the dimensional stability, it is preferable to conduct a latter stage of the heat treatment under relaxed state to enable shrinkage of the laminate.

The heat treated film laminate is continuously wound at a rate of 0.5–40 m./min., preferably 15–40 m./min., this rate being substantially equal to the speed of the laminate as delivered out of the high speed roll at the neck-drawing stage. A plurality of films as closely superposed are simultaneously drawn according to the invention and therefore even if one of them is damaged the other(s) is prevented from damage or breakage so that a high speed and stable operation can be realized. Usually, a damage, if any, occurs in the uppermost film layer, which may readily be delaminated or separated after drawing as explained before.

If desired, the drawn film laminate can be further stretched in the direction transverse to the direction of the initial drawing, before or after the heat treatment. Such a further stretch may be conducted in any suitable manner known per se, e.g. on a stenter. This stretching should be conducted at a temperature of 80–130° C. and at a low rate so as not to collapse the voids. The stretch ratio may be so selected that the film surface area becomes 12–80 times, preferably 14–64 times the original (before the initial drawing).

The invention will be further explained by referring to the accompanying drawings wherein.

Figure 1:
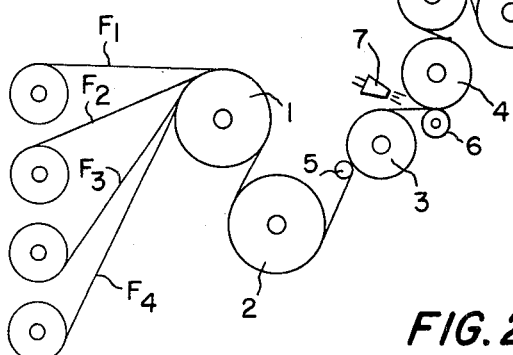
FIG. 1 is a schematic side elevation of an apparatus suitable to carry out the method of this invention.
Figure 2:
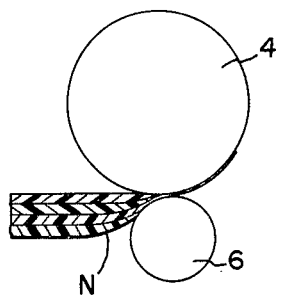
FIG. 2 is an enlarged side view of a high speed drawing roll associated with a heated roller, with a neck formed immediately before the high speed roll, the films and neck being shown in an extremely exaggerated state to facilitate understanding.

In the embodiment shown in FIG. 1, four polypropylene films $F_1$, $F_2$, $F_3$ and $F_4$ are used. These films are superposed and brought into close contact with one another by removing air between the adjacent films on non-skid rolls 1, 2 and the film laminate is drawn between a low speed roll 3 and a high speed roll 4. These draw rolls are maintained at a low temperature. In order to provide temperature gradient in cross-sectional direction in the film laminate and to localise the neck position it is preferable to contact a cooling roll 5 and heating roll 6 respectively with the low speed roll 3 and high speed roll 4 as shown. Further, it is preferable to provide a nozzle 7 to direct a jet stream of cooling gas (usually air) to the surface of the laminate immediately before the contact with the high speed roll 4. The heating roll 6 is usually heated to 80–150° C. When the film laminate is so drawn there is formed a neck N immediately before the high speed roll 4 as shown in FIG. 2 and voids are produced in the laminate to render the latter pearly in appearance. This change from transparency into pearly luster due to the formation of voids when drawn through the neck is visible.

The drawn laminate now having pearly luster and in which the component films have been adhered is then passed over a cooling roll 8 and then over a series of heated rolls 9 for heat treatment. If it is desired to delaminate the uppermost layer or film in the drawn laminate it may be carried out when the laminate leaves the cooling roll 8 as shown in FIG. 1. The delaminated film may be immediately wound up (not shown) or may be heat treated through a series of heated rolls 10. The heat treated laminate is cooled on cooling rolls 11 and finally wound up at 12. The delaminated film, if heat treated, may be cooled on the same cooling rolls 11 and wound up at 13.

Figure 3:
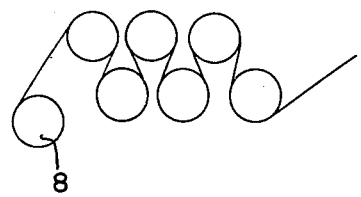
FIG. 3 is a schematic side elevation of another embodiment of a series of rolls for conducting a heat treatment.

If it is desired to increase the area of contact of the laminate to the heated rolls for the heat treatment, it is possible to arrange the heated rolls following the cooling roll 8 in zigzag as shown in FIG. 3.

Figure 4:
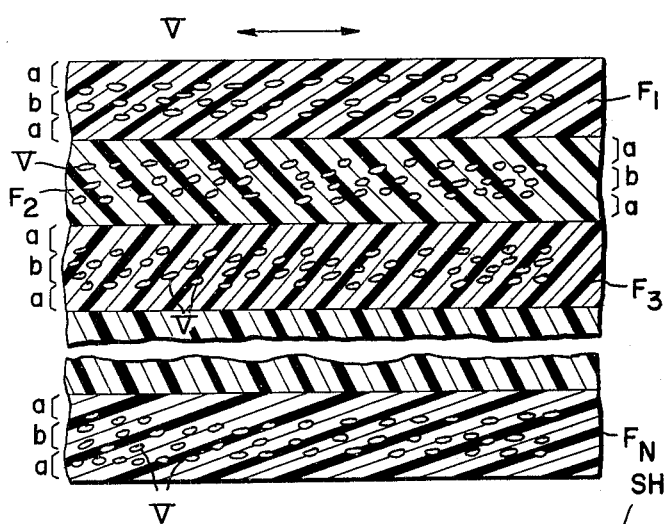
FIG. 4 is an enlarged and schematic cross section of a laminate obtained by this invention.

FIG. 4 is a schematic cross section of a product of this invention. The thickness of each component film is less than $30\mu$ and usually $10$–$30\mu$. The total thickness of the laminate is $20$–$200\mu$.

It has been found that $t/t_1$ ratio of the thickness $t$ of a thin surface layer $a$ having no void to the thickness $t_1$ of an inner layer $b$ having voids V is somewhat different depending on the thickness of the unoriented film and the draw ratio. However, it has been found that the voids are distributed at a value of $t/t_1$ of 0.20 to 0.40. The length $l$ of the longitudinal axis of the void V is directly proportional to the thickness of the unoriented film and the draw ratio. As a result of investigating the relation between the microstructure of the film having such voids and the beauty value from the optically measured values by the naked eye, light reflection factor and extinction coefficient, it has been found that the most desirable light reflection factor is 85 to 97% and the most desirable extinction coefficient is 10%/mm. to 30%/mm. It has also been found that the larger the 110-W index P defined by the following formula $$P = t \times 10^2 / t_1 \times l$$

the higher the beauty value. P gives a value of 5 to 90. Since $t/t_1$ does not fluctuate too much, it would be necessary to make the value $l$ small in order to obtain a desirable large value P. Further the value $l$ becomes large in proportion to the thickness of the unoriented film and the draw ratio. Therefore, it is necessary to keep $t_1$ small. Specficially, when the film is to be drawn at a high ratio, the use of an unoriented film of 20 to $50\mu$ in thickness is most preferable. However, such a thin single film cannot be successfully drawn at a high draw ratio in a conventional method. This, however, is enabled according to this invention wherein a plurality of laminated films is drawn under particular conditions.

The above mentioned extinction coefficient is given by K represented by the following formula:

$$K = \frac{1}{d} \log \frac{1}{T}$$

wherein $d$ is the total thickness of the laminate and $T$ is a light (560 m$\mu$) transmission coefficient. The formula, however, is not applicable to those cases where colored film is used for at least one component layer in the laminate.

The laminate obtained by this invention is useful in any of conventional applications where usual transparent polypropylene may be used. Since the laminate of this invention has beautiful pearly luster it is particularly useful as decorative and wrapping materials. It is also useful as thermal insulation sheet, shock absorbing sheet, etc.

The beautiful appearance of the laminate of this invention may be enhanced by incorporating colored or differently colored film(s) in the laminate.

The invention will be explained in more detail by referring to the following examples.

EXAMPLE 1

Undrawn films of various thicknesses were made by melting and extruding at 285° C. polypropylene of an isotactic index of 95% and an intrinsic viscosity of 220 dl./g. and quenching to 15° C. Further, colored undrawn films were also prepared in the same manner but mixing 0.01% by weight of a pigment into the polypropylene.

These films shall be referred to by the following abbreviations—

C: Uncolored film.
R: Red colored film.
B: Blue colored film.
G: Green colored film.
P: Purple colored film.
Y: Yellow colored film.

The numerals attached to the ends of these alphabets represent the thickness ($\mu$) of the films.

The drawability of films $C_{50}$ and $C_{250}$ and the characteristics of the pearly lustrous films obtained therefrom were measured. That is to say, 5 superposed films $C_{50}$ and a single film $C_{250}$ were separately drawn between a low speed roll at 24.5° C. and a high speed roll at 66° C. The temperature of the film(s) was 25° C. at a point where the film(s) leaves the low speed roll. The distance from the point at which the film left the low speed roll to the point at which it came into contact with the high speed roll was 1 mm. The drawability was measured on the following items:

(1) Maximum drawing velocity at a draw ratio of 6.5.
(2) Winding velocity at which 1000 m. of a film 0.5 m. wide could stably be wound up at a draw ratio of 6.5.
(3) Maximum draw ratio at a drawing rate of 10 m./min.

Further, various characteristics of films obtained at a draw ratio of 6.5:1 and a drawing rate of 1 m./min. were measured. The results are shown in Table 1.

TABLE 1

| Measured items | 5 films $C_{50}$ (Present invention) | 1 film $C_{250}$ (Conventional process) |
|---|---|---|
| Drawability: | | |
| Maximum drawing velocity, m./min | 35 | 7 |
| Winding velocity, m./min | 12 | 0.7 |
| Maximum draw ratio | 12:1 | 7.8:1 |
| Characteristics of resulting films: | | |
| Density, g./cm.$^3$ | 0.621 | 0.712 |
| $l$ (Thickness of the void) | 1.5$\mu$ | 3.4 |
| $t_1$ (Thickness of the film) | 11.8$\mu$ | 55.0 |
| $t$ (Thickness of the surface layer) | 2.8$\mu$ | 7.5 |
| Extinction coefficient/mm | 18.5 | 16.5 |
| Light reflection factor, percent | 93 | 87 |
| Ultraviolet ray permeability, percent | 0.03 | 3.3 |
| Pearly luster [1] | ⊚ | x |
| Number of pinholes, m.$^2$ | 1/1,000 | 77 |
| Tensile strength, kg./cm.$^2$ | 2,950 | 2,600 |
| Adhesion between films after thermosetting [2], g./cm | 200 | |

[1] Measured with the naked eye as compared with pearls:
⊚ = Very close.
o = Close.
Δ = Rather close.
x = Not so close.
[2] At 130° C. for 0.5 second.

EXAMPLE 2

There were measured various characteristics and pearly lusters of drawn polypropylene films as obtained by combining various numbers and colors of films and drawing them under the same conditions as in Example 1 except that the drawing temperature was 20° C., the draw ratio was 7.2:1 and the drawing rate was 0.2 m./min. (in this example, the drawing rate was low because only a single film was also used). The results are shown in Table 2.

TABLE 2

| No. | Combination of films | $n^1$ | $t_1$ | $l$ | $t$ | Pearly luster | $t \times 10^2/t_1$ |
|---|---|---|---|---|---|---|---|
| 1 | $C_{250}$ | 1 | 57 | 3.9 | 13 | x | 6.25 |
| 2 | $C_{200}$ | 1 | 46 | 3.2 | 9.6 | x | 6.50 |
| 3 | $C_{150}$ | 1 | 33 | 2.9 | 7.2 | x | 7.5 |
| 4 | $C_{100}$ | 1 | 24 | 1.4 | 5.2 | x | 15.4 |
| 5 | $C_{70}$ | 1 | 16 | 1.3 | 3.5 | x—Δ | 16.8 |
| 6 | $C_{50}$ | 1 | 10.9 | 1.0 | 3.0 | Δ | 27.5 |
| 7 | $C_{30}$ | 1 | 7.2 | 0.8 | 1.9 | Δ | 35.5 |
| 8 | $C_{20}$ | 1 | 4.5 | 0.5 | 1.7 | Δ | 75.6 |
| 9 | $Y_{250}$ | 1 | 58 | 3.3 | 16 | x | 8.4 |
| 10 | $Y_{200}$ | 1 | 47 | 3.1 | 9.6 | x | 6.8 |
| 11 | $Y_{150}$ | 1 | 33 | 2.9 | 7.2 | x | 7.4 |
| 12 | $Y_{100}$ | 1 | 24 | 1.4 | 5.3 | x | 15.7 |
| 13 | $Y_{70}$ | 1 | 16 | 1.3 | 3.6 | x—Δ | 17.3 |
| 14 | $Y_{50}$ | 1 | 10.9 | 1.0 | 3.2 | Δ | 29.3 |
| 15 | $Y_{20}$ | 1 | 4.5 | 0.5 | 1.7 | Δ | 65.6 |
| 16 | $B_{200}$ | 1 | 46 | 3.2 | 9.6 | x | 6.5 |
| 17 | $B_{70}$ | 1 | 16 | 1.3 | 3.5 | x—Δ | 16.8 |
| 18 | $B_{30}$ | 1 | 7.1 | 0.8 | 1.9 | Δ | 33.5 |
| 19 | $B_{20}$ | 1 | 4.5 | 0.5 | 1.7 | Δ | 75.6 |
| 20 | $R_{250}$ | 1 | 56 | 3.9 | 14 | x | 6.4 |
| 21 | $R_{50}$ | 1 | 11.0 | 1.0 | 3.0 | Δ | 27.2 |
| 22 | $R_{20}$ | 1 | 4.5 | 0.5 | 1.7 | Δ | 75.6 |
| 23 | $C_{30} C_{30}$ | 2 | 7.0 | 0.8 | 1.9 | o | 34.0 |

TABLE 2—Continued

| No. | Combination of films | $n^1$ | $t_1$ | $l$ | $t$ | Pearly luster | $t \times 10^2/t_1$ |
|---|---|---|---|---|---|---|---|
| 24 | $R_{30} B_{30}$ | 2 | 7.1 | 0.8 | 1.8 | o | 31.7 |
| 25 | $C_{250} C_{250} C_{250}$ | 3 | 55 | 3.8 | 12 | x | 5.8 |
| 26 | $C_{200} C_{200} C_{200}$ | 3 | 45 | 3.2 | 9.5 | x | 6.6 |
| 27 | $R_{200} B_{200} B_{200}$ | 3 | 44 | 3.3 | 9.8 | x—△ | 6.8 |
| 28 | $C_{150} C_{150} C_{150}$ | 3 | 32 | 2.9 | 7.2 | x—△ | 7.8 |
| 29 | $C_{100} C_{100} C_{100}$ | 3 | 23 | 1.4 | 5.2 | △ | 16.1 |
| 30 | $R_{100} B_{100} R_{100}$ | 3 | 22 | 1.4 | 5.3 | △—o | 17.1 |
| 31 | $C_{70} C_{70} C_{70}$ | 3 | 15 | 1.2 | 3.5 | △ | 18.6 |
| 32 | $R_{70} B_{70} R_{70}$ | 3 | 15 | 1.3 | 3.4 | △—o | 17.5 |
| 33 | $C_{50} C_{50} C_{50}$ | 3 | 10.7 | 1.1 | 3.0 | △—o | 25.5 |
| 34 | $C_{50} B_{50} C_{50}$ | 3 | 10.7 | 1.1 | 3.0 | o | 25.5 |
| 35 | $C_{30} C_{100} C_{30}$ | 3 | 7.0–2.3 | 0.5–1.4 | 1.8–5.2 | △—o | 51.4–16.1 |
| 36 | $C_{20} C_{30} C_{20}$ | 3 | 4.5–7.0 | 0.5 | 1.8 | o | 80–51.4 |
| 37 | $C_{20} C_{20} C_{20}$ | 3 | 4.5 | 0.5 | 1.7 | o | 75.6 |
| 38 | $C_{20} B_{20} C_{20}$ | 3 | 4.5 | 0.5 | 1.7 | o—⊙ | 75.6 |
| 39 | $R_{20} B_{20} R_{20}$ | 3 | 4.8 | 0.6 | 1.7 | ⊙ | 59.0 |
| 40 | $R_{20} B_{30} R_{30} B_{20}$ | 4 | 4.8–7.0 | 0.6 | 1.7 | ⊙ | 59.0–43.0 |
| 41 | $C_{20} C_{20} C_{20} C_{20}$ | 4 | 4.5 | 0.5 | 1.7 | o | 75.6 |
| 42 | $R_{20} Y_{20} B_{20} Y_{20} R_{20}$ | 5 | 4.3 | 0.45 | 1.6 | ⊙ | 83.0 |
| 43 | $C_{20} C_{20} C_{20} C_{20} C_{20} C_{20} C_{20}$ | 7 | 4.3 | 0.45 | 1.6 | ⊙ | 83.0 |
| 44 | $R_{20} C_{20} B_{20} C_{20} R_{20} C_{20} R_{20}$ | 7 | 4.3 | 0.46 | 1.7 | ⊙ | 86.0 |

[1] $n$ is a number of overlapped films.

As is apparent from the above table, that the more and thinner the overlapped films and when colored films were used, the higher the pearly luster.

EXAMPLE 3

Drawn polypropylene films having a pearly luster were obtained from films $C_{50}$ and $C_{250}$ under the same conditions as in Example 1 except that the draw ratio was 7.2:1, the drawing rate was 5 m./min. and the drawing temperature was varied. The densities of the resulting pearly films are shown in Table 3.

TABLE 3

| Drawing temperature, °C.: | Film laminate obtained from 5 films $C_{50}$ (Present invention), g./cm.³ | Film obtained from a single film $C_{250}$ (Conventional process), g./cm.³ |
|---|---|---|
| 0 | 0.595 | 0.632 |
| 10 | 0.597 | 0.635 |
| 20 | 0.612 | 0.695 |
| 30 | 0.622 | 0.695 |
| 40 | 0.785 | 0.799 |
| 45 | 0.800 | 0.835 |
| 50 | 0.899 | 0.900 |
| (Undrawn film) | 0.890 | 0.891 |

As evident from the above table, a quick density variation is seen around a drawing temperature of 45° C. This means that the production of voids becomes remarkable below this temperature. Further, the density of the film of the present invention is lower than that of the film obtained by the conventional process.

EXAMPLE 4

A film (A) of the present invention was obtained by thermosetting three overlapped films $C_{100}$ at 130° C. for 0.5 second after monoaxially drawing them under the same conditions as in Example 1 except that the drawing temperature was 30° C., the drawing rate was 5 m./min. and the draw ratio was 6.7:1.

A film (B) of the present invention was obtained by stretching the film (A), after drawing but before thermosetting, in the direction at right angles to the direction of the initial drawing at a temperature of 90° C., drawing rate of 25 m./min. and a draw ratio of 2.5:1.

The various characteristic values of these films as compared with a conventional biaxially drawn single film are shown in Table 4.

TABLE 4

| | Film B | Film B | Conventional film |
|---|---|---|---|
| Measured items: | | | |
| Thickness, μ | 41 | 32 | 25 |
| Density, g./cm.³ | 0.601 | 0.452 | 0.890 |
| Number of pinholes | 0/1,000 m.² | 0 | 0 |
| Extinction coefficient, mm | 13 | 13 | 1.5 |
| Light reflection factor, percent | 72 | 72 | 65 |
| Gas-permeability: | | | |
| Carbon dioxide [1] | 9.5 | 0.45 | 0.44 |
| Oxygen [1] | 6.2 | 0.43 | 0.42 |
| Steam [2] | 2.55 | 0.135 | 0.132 |
| Liquid-permeability [3]: | | | |
| Benzene | 2,160 | 100 | 95 |
| Methyl ethyl ketone | 27 | 2 | 2 |
| Ethyl acetate | 35 | 1.5 | 1.3 |
| Ethyl alcohol | 0.01 | 0.0001 | 0.0001 |

[1] Measured by ASTM D-1434-58 for 24 hours under the atmospheric pressure; g./m.² mm.·24 hr./atm.
[2] In g./m.²/mm. 24 hours/95% RH as measured by the method of JIS Z-0208.
[3] In g. of the liquid permeating the film 25μ thick per m.² for 24 hours.

As evident from the above table, it is seen that, by the biaxial drawing, the gas and liquid-permeabilities remarkably increased.

What I claim is:

1. A method of producing a polypropylene film laminate which comprises superposing a plurality of polypropylene films, cold-drawing the superposed films through a neck at a rate sufficient to cause the formation of voids while keeping a temperature not higher than 45° C. at least one surface of the film laminate as fed in the necking stage, and then heat treating the resulting film laminate by press-contacting the same on a series of heated rolls.

2. A method as claimed in claim 1 wherein the drawing is conducted between a low speed roll and a high speed roll associated with a heating roll, the superposed film laminate is passed over the low speed roll and then between the high speed roll and the heating roll, and a cooling air is directed to one surface of the laminate immediately before contacting the high speed roll so as to produce a temperature difference of at least 10° C. between the surfaces of the laminate as fed to the high speed roll.

3. A method as claimed in claim 1 wherein the draw ratio is 4–10.

4. A method as claimed in claim 1 wherein the heat treatment is conducted at 100–160° C. for 0.5–60 seconds.

5. A method as claimed in claim 1 wherein each of the films to be superposed has a thickness not exceeding 200μ and the total thickness of the superposed films does not exceed 1000µ.

6. A method according to claim 1 wherein the uppermost film layer is delaminated and separated after the drawing but before the heat treatment.

7. A method according to claim 4 wherein the heat treatment is conducted while stretching the laminate at a stretch ratio of 1.2–1.7.

8. A method according to claim 2 wherein the distance between the point where the laminate leaves the low speed roll and the point where the laminate contacts the high speed roll is 0.1–10 mm.

9. A method according to claim 1 wherein at least one of the films to be superposed is colored.

References Cited

UNITED STATES PATENTS

| 3,022,541 | 2/1962 | Passley et al. | 264—291 |
| 3,380,868 | 4/1968 | Moser | 156—306 |

CARL D. QUARFORTH, Primary Examiner

B. H. HUNT, Assistant Examiner

U.S. Cl. X.R.

156—229, 306